United States Patent [19]
Julian et al.

[11] Patent Number: 5,639,268
[45] Date of Patent: Jun. 17, 1997

[54] THROUGH THE WALL CONNECTOR

[75] Inventors: Kenneth A. Julian, Oak Brook; John Julian, Elmhurst, both of Ill.

[73] Assignee: Julian Electric, Inc., Westmont, Ill.

[21] Appl. No.: 562,505

[22] Filed: Nov. 24, 1995

[51] Int. Cl.⁶ .................................................. H01R 13/42
[52] U.S. Cl. .............................. 439/737; 439/908; 439/801
[58] Field of Search ........................................ 439/737, 738, 439/739, 908, 801

[56] References Cited

U.S. PATENT DOCUMENTS

| | | | |
|---|---|---|---|
| 1,677,326 | 7/1928 | Bowen | 439/801 |
| 2,060,757 | 11/1936 | Hill | 439/738 |
| 2,145,744 | 1/1939 | Whitney | 439/737 |
| 2,897,472 | 7/1959 | O'Brien | 439/738 |
| 2,967,289 | 1/1961 | Day | 439/737 |
| 3,564,481 | 2/1971 | Young | 439/801 |
| 4,076,368 | 2/1978 | Erickson | 439/737 |

*Primary Examiner*—David L. Pirlot
*Assistant Examiner*—Tho Dac Ta
*Attorney, Agent, or Firm*—Patnaude, Videbeck & Marsh

[57] ABSTRACT

Through the wall hot and ground type stud connectors are disclosed for use being positioned through truck and other heavy duty motor vehicle battery box side walls, engine firewalls, dashboards and the like. The stud connector includes a unitary conductive connector element with opposed first and second male connector ends and a radially enlarged central segment therebetween. In the hot type stud connector an overmold insulative member extends around part of the enlarged central segment and has a face that abuts a surface of a wall member and an annular flange that extends through a wall aperture to insulate the connector from the wall. An insulative nut member has a face for abutting an opposing surface of a wall member. A complementary cylindrical recess in the nut member slidingly receives the annular flange for fitting through various thicknesses of walls. The ground connector has a smaller overmold insulative member with a face for abutting one surface of a wall member. The enlarged central segment of the connector includes a radially extending face for abutting electrically conductive contact with a wall member radially outwardly of an aperture through the wall.

11 Claims, 2 Drawing Sheets

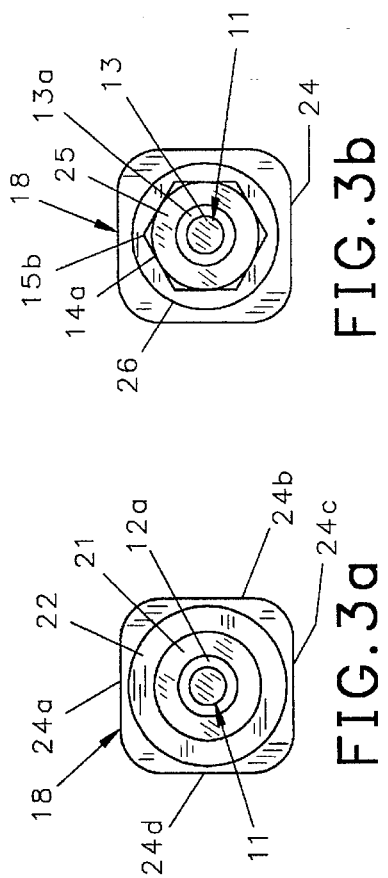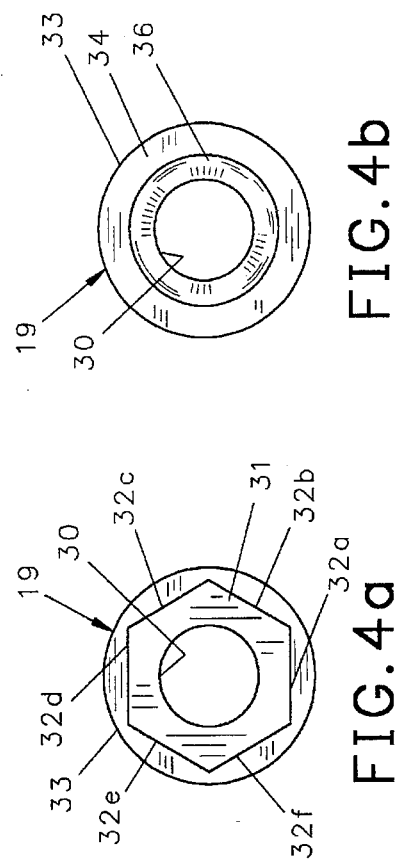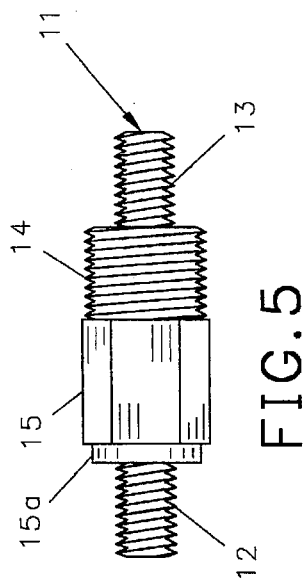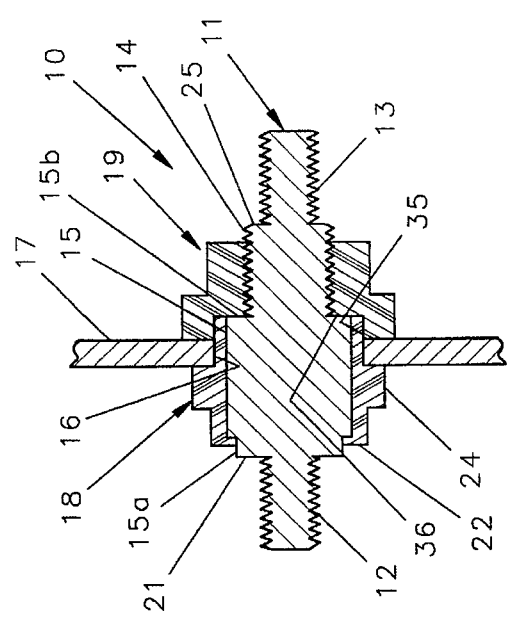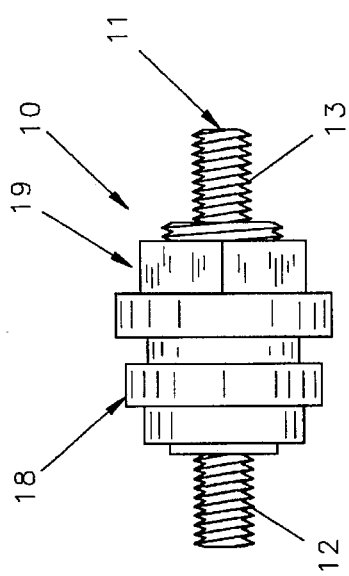

5,639,268

THROUGH THE WALL CONNECTOR

This invention relates generally to electrical stud-type connectors, and more particularly, to hot and ground type stud connectors positionable through battery box side walls, engine fire walls, dash boards and the like in modern trucks and other heavy duty motor vehicles to provide ready access to a 12 volt DC power source.

BACKGROUND OF THE INVENTION

In heavy duty trucks and other large industrial and commercial motor vehicles, it is desirable to provide a readily accessible external source of 12 volt direct current voltage, both positive and, in some cases, negative terminals for providing jump start capability for powering emergency light sources, running electric air compressors and the like.

On large commercial and industrial vehicles, it is common to have a metal battery box that completely encloses the single or multiple storage battery electrical source. Typically, this battery box may be located outside of the engine compartment or cab of an over-the-road truck in proximity to the running board or gasoline tanks. Since the batteries are positioned outside of the vehicle, the battery boxes have tightly closed covers that protect the batteries from the elements. Jump start connectors may extend through the battery box sidewall. Typically, these connectors may extend through apertures in the side wall of the battery box and include some type of insulative cap or cover which can be removed to provide access to the positive hot terminal and/or the negative ground terminal. Prior stud-type through the wall connectors have included connectors composed, in the main, of threaded stud bolts having insulative jackets positioned thereover including a pair of opposing frame mounting bolts, one on each side of the current carrying studbolt.

One other prior type of stud connector includes an annular insulative jacket positioned over a central portion of the stud bolt and held in position by a metal washer soldered at its interior aperture to the stud bolts. Problems with this type of through-the-wall connector occur when cable connectors are mounted on the threaded end of the stud bolt such that a major portion of the current passing therethrough passes from the stud bolt through the washer and onto the metal end of the cable connector. The soldered joint between the stud bolt and the washer becomes critical to the transmission of current from the stud bolt to the cable connector and it is the weakest conductive link in the stud connector. Additionally, the washer holding the annular insulator in place gives the appearance that the body of the stud connector is much more metal massive than is the case in reality, with a viewer imagining that the metal of the washer extends axially through the connector.

A need has developed for a through-the-wall connector wherein the current carrying portion of the connector is made of a single piece of metal and is more substantial than heretofore known. A need has also developed to be able to position additional through-the-wall electrical connectors of differing physical sizes at remote positions away from the battery box of a vehicle for more convenient access to a 12 volt direct current source.

A need has also developed to provide a through-the-wall connector with annular insulator portions surrounding the central body of the stud connector and mounting same on the wall also enabling the connector to be mounted to walls of differing thicknesses.

It is therefore an object of the present invention, generally stated, to provide an improved through-the-wall stud type connector with improved current carrying capacity and mounting adjustability to fit through differing sized wall panels.

SUMMARY OF THE INVENTION

This invention is directed to a stud connector for mounting on a wall member. The stud connector comprises an electrically conductive connector element including opposed first and second distal male means for attaching female electrically conductive members thereon. Opposed first and second flat annular land means are each positioned inwardly adjacent the respective ones of the distal male means for attaching female conductors. Each of the annular land means provides surface area electrical contact with any female conductive members which are mounted thereon. A central segment of the stud connector positioned between the opposed distal male means has a diameter at least as great as the smaller diameter of the first and second flat annular land means.

The invention is further directed to an annular insulated member around the central segment. The annular insulating member includes a radial flange for abutting one side of the wall member and an annular flange for extending through an aperture in any wall member. A wall mounting nut includes a threaded aperture for matingly engaging a threaded portion of the central segment and an outer flange for abutting an opposing side of a wall member. An annular recess between the outer flange and the threaded aperture slidably receives the annular flange on the annular insulative member. The annular flange and the annular recess provide adjustability on the stud connector for mounting same through walls of differing thicknesses.

BRIEF DESCRIPTION OF THE DRAWINGS

The features of the present invention, which are believed to be novel, are set forth with particularity in the appended claims. The invention may best be understood from the following detailed description of currently preferred embodiments thereof taken in conjunction with the accompanying drawings wherein like numerals refer to like parts, and in which:

FIG. 1 is an elevational sectional view of the through-the-wall stud connector constructed in accordance with the present invention, as it appears mounted through an aperture in a wall panel;

FIG. 2 is an elevational view of the through-the-wall connector shown in FIG. 1 as it appears in unmounted but complete condition;

FIG. 3A is a left end elevational view of the through-the-wall connector shown in FIG. 2 without the attachable plastic nut thereon;

FIG. 3B is a right end elevational view of the connector shown in FIG. 2 without the attachable plastic nut;

FIG. 4A is a right end elevational view of the plastic nut;

FIG. 4B is a left end elevational view of the plastic nut;

FIG. 5 is an elevational view of the metal portion of the through-the-wall connector;

DETAILED DESCRIPTION OF THE PREFERRED EMBODIMENTS

Figure 7B:
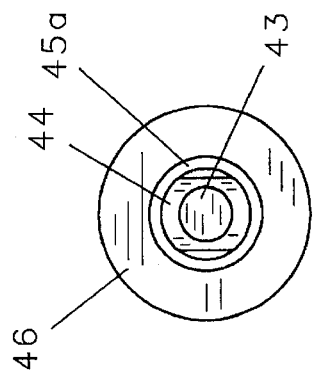
FIG. 7B is a right end elevational view of the connector of the second embodiment without a nut threaded thereon.

Referring to FIGS. 1–5, a hot or positive terminal through-the-wall stud connector, generally indicated at 10, includes a central metal stud bolt 11 made of highly electrically conductive material, preferable copper alloy, extends from one end of the connector to the other with the opposed distal outer threaded portions 12 and 13 thereof being the smallest diameter portions of the stud bolt. Immediately inwardly adjacent the right hand distal threaded portion 13, in a central segment of the connector, is a larger diameter nut engaging threaded portion 14. Between the nut engaging portion and the left distal threaded portion 12 is a hexagonal central portion 15 which, in this embodiment, is the portion of the connector which is positioned through any aperture, such as aperture 16 in battery box side wall 17 shown in FIG. 1. An over molded housing 18 extends over the hexagonal central bolt portion and is made up of insulative material, preferably plastic, so that a portion of the central overmolded portion comes between the central bolt portion 15 and the aperture 16 of the battery box side wall 17 to prevent current flow therebetween. After the central hexagonal portion and the overmolded plastic portion 15 and 18 are positioned through aperture 16, the through-the-wall connector 10 is held in place by a plastic nut 19 which is threaded on the larger nut engaging portion 14 of the central segment 15 of stud bolt 11.

As shown most clearly in FIGS. 1 and 2, the entire central segment 15 of the connector is covered by insulative plastic members, namely, the overmolded member 18 and the threaded plastic nut 19 forming a substantial insulation between, and rigid mounting of, the connector 10 through the aperture 16 of a battery box or other side wall 17.

Referring to FIGS. 3A and 3B in connection with FIGS. 1 and 2, in FIG. 3A the left hand side of the combined stud nut 11 and overmolded central member 18 is shown. The thread 12A of left hand distal threaded portion 12 is shown centrally in FIG. 3A. A vertical annular electrically conductive flange or land 21 extends radially outwardly from the inner end of left hand distal threaded portion 12 to provide for a substantial surface engagement with the flat side of the distal end of any female electrical connector (not shown) adjacent an aperture (not shown) which fits through the left hand stud bolt threaded portion 12.

Radially outward from the vertical current carrying radial flange 21 is the left end 22 of the central overmolded member 18. The outermost portion of the over molded portion 18 forms a generally rectangular surface 24 having four flat sides 24A through 24D which are adapted to matingly engage an open end wrench or an adjustable wrench for mounting the through-the-wall connection in an aperture such as 16 of battery box side wall 17.

Referring to FIG. 3B, from the right side of the overmolded member 18 and the stud bolt 11, centrally the outer thread 13A of right hand threaded portion 13 is seen first. Next, a vertical current conductive annular flange 25 forming the right threaded end of the larger nut engaging portion of the stud bolt provides a substantial annular surface contact area on which current carrying cable connections are mounted by positioning a female connection over the right end threaded portion 13 of the stud bolt 11. Next, radially outwardly, an end thread 14a of outer enlarged threaded portion 14 is shown. Outer threaded portion 14 threadedly engages the plastic nut 19 when the through-the-wall connector 10 is firmly mounted on a battery box side wall 17. Radially outwardly, the hexagonal outline 15b of the central hexagonal portion of the stud bolt 11 is shown. Again, radially outwardly from the hexagonal outline 15b of the central portion 15 of the stud bolt 11 is the outer wall 26 of the over molded member 18 that extends through the aperture 16 of battery box 17. The outermost portion 24 of the over molded member 18 is rectangular in shape as previously mentioned.

Referring to FIGS. 4A and 4B, the plastic nut 19 includes a central threaded aperture 30, a right hand face flange 31 and a hexagonal grouping of six flat surfaces 32A through 32F which are adapted to engage an open end or box wrench or an adjustable wrench to combine with a second wrench engaging two opposing flats 24a–24d on over molded member 18 to firmly mount the stud bolt connector to the battery box side wall 17. The outer surface 33 of plastic nut 19 is cylindrical in shape. Referring to FIG. 4B, from the left side, the outer surface 33 of plastic nut 19 can be seen. An annular face flange 34 is flat and adapted to engage one side of the battery box side wall 17. Inwardly from annular face 34 is a second annular recessed face 36 which is connected to face 34 by a cylindrical flange 35 (see FIG. 1). In one aspect of the present invention, it is the combined depth of circular flange 35 and also the additional depth of cylindrical flange 26 (FIG. 3b) which provides for the adjustability in mounting the through-the-wall connector 10 through apertures in walls of varying thicknesses. Most centrally, the left hand side of threaded plastic nut 19 includes the inner threaded surface 30 which is also seen from the right hand side. It should also be noted that in a preferred embodiment, cylindrical flange 26 is not threaded in order to provide the maximum insulation between stud bolt 11 and aperture 16 of side wall 17.

Referring to FIG. 5, the stud bolt is shown without the overmolded portion 18 and clearly includes left hand distal threaded portion 12 and right hand distal portion 13, enlarged threaded portion 14, central hexagonal portion 15 making up the central segment 15 of the bolt, and an annular flange 15A between the central portion 15 and the left hand threaded distal end 12. It should be noted that the connector 10 of the invention can be fitted in thicker walls than shown in FIG. 1. In such a mounting, there would be a slight space between the hexagonal outline face 15B shown in FIG. 3B and FIG. 1 and the inner annular face 36 of the threaded plastic nut 19. It should be noted that the through-the-wall connector 10 of the present invention provides for substantial electrical conduction therethrough by having the left and right distal threaded members 12 and 13, respectively, being the thinnest portion of the stud bolt 11, and also including substantial electrically conductive annular faces 21 and 25 adjacent thereto, respectively, for substantial electrical conduction between cable distal ends, not shown, and the stud bolt 11.

Figure 6:
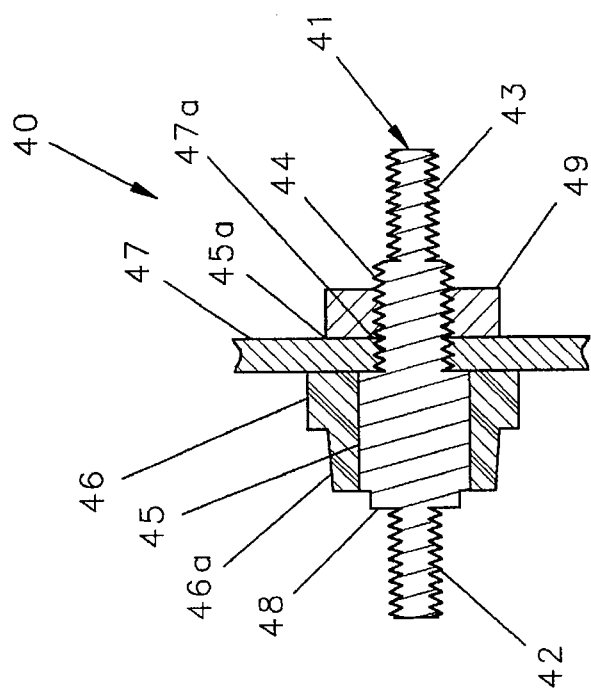
FIG. 6 is an elevational sectional view of a second embodiment of the present invention utilized for ground or negative terminal connections.

Referring to FIG. 6, a second embodiment of the through-the-wall connector, generally indicated at 40, is meant for use as a negative pole or ground connector. Similarly to the first embodiment, the negative ground connector 40 includes a substantial metal conducting stud bolt 41 having left and right distal threaded portions 42–43, respectively, a larger threaded portion 44 inwardly adjacent the right hand distal threaded portion 41, and, in this embodiment, an enlarged central cylindrical portion 45 between the larger threaded portion 44 and the left hand distal threaded portion 42. Similarly the the first embodiment, an over molded plastic member 46 is fitted over the outside of the large central portion 45 of stud bolt 41. However, unlike the first embodiment, the over molded portion 45 does not extend beyond and around the ends of the central portion 45.

Therefore, a flat vertical annular face 45A, forming the right hand end of central hexagonal portion 45, is free to electrically conductively engage a battery box side wall 47 when the enlarged threaded portion 44 is positioned through an aperture 47A in the side wall 47. A threaded nut 49, which may be a conventional steel nut, is threaded onto larger threaded portion 44 to engage an opposing side of a battery box sidewall 17.

Figure 7A:
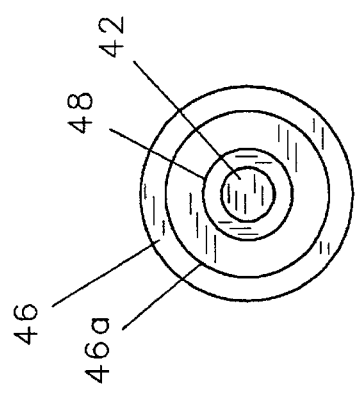
FIG. 7A is a left end elevational view of the connector of the second embodiment without a nut threaded thereon.

Referring to FIGS. 7A and 7B, from the left end in FIG. 7a, the left side distal threaded portion 42 of stud bolt 41 forms the center of the stud bolt. A circular flange 48 forms the left hand end of the central cylindrical portion 45 of stud bolt 41. The annular over molded portion 46 includes a frustoconical ramp 46A and an outer circumferential portion 46. From the right hand end in FIG. 7b, the connector includes the right hand distal threaded portion 43, the enlarged threaded portion 44, and the current conducting annular face 45a of central portion 45. The overmolded insulative cover 46 forms the outermost portion of the stud bolt 41.

In modern heavy duty trucks and industrial motor vehicles, the need for access to 12 volt direct current power exists at more locations than simply adjacent the battery box thereof. The positive and negative through-the-wall connectors disclosed herein may be sized differently for mounting through various walls in the motor vehicle, such as a fire wall for providing 12 volt connectors adjacent the engine compartment of the vehicle, and also through control panels or dash boards in large industrial motor vehicles. There may be a need for direct current 12 volt power source in a large motor vehicle cabin to run test equipment, provide emergency lighting, or the like. As such, these handy through-the-wall connectors may be mounted at various positions around large trucks and motor vehicles with the exposed threaded distal ends covered by removable caps, not shown, made of insulative material to isolate the power sources when not in use or when not needed, and yet provide ready removability and access to 12 volt direct current sources at convenient locations around the motor vehicle. The opposing inner ends of the through-the-wall connectors are connected to the battery power by insulated internal wiring.

While two embodiments of the present invention have been shown and described, it will be understood by those skilled in the art that changes and modifications may be made without departing from the invention in its broader aspects. Therefore, the aim of the appended claims is to cover all such changes and modifications as fall within the true spirit and scope of the present invention.

The invention is claimed as follows:

1. A stud connector for mounting on a wall member, said stud connector comprising:
   a unitary electrically conductive connector element including opposed first and second distal male means for attaching female electrically conductive members thereadjacent;
   opposed first and second flat annular land means each positioned inwardly adjacent and radially outwardly of the respective ones of said distal male means, each said annular land means for providing surface area electrical contact with any female conductive members mounted thereadjacent;
   a central segment of said stud connector positioned between said distal male means having a diameter at least as great as the smaller outer diameter of said first and second flat annular land means.

2. The stud connector as defined in claim 1 wherein said first and second male means for attaching female electrically conductive members thereon include threaded portions on each.

3. The stud connector as defined in claim 1 wherein a portion of said central segment is threaded, and a flat annular land inwardly adjacent said threaded portion and facing said threaded portion is adapted for surface electrically conductive engagement with one surface of any wall member through which the stud connector is mounted.

4. The stud connector as defined in claim 3 further including an electrically conductive wall mounting nut for matingly engaging said central segment threaded portion and for engaging an opposing surface of any wall member through which the stud connector is mounted.

5. A stud connector for mounting on a wall member, said stud connector comprising:
   a unitary stud bolt including opposed first and second generally cylindrical male distal means for attaching female conductors thereon and a radially enlarged central segment positioned therebetween;
   an annular insulative member around said central segment, said annular insulative member including a radial flange for abutting one side of a wall member, and an annular flange for extending through an aperture in any wall member,
   a portion of said central segment externally of said insulative member being threaded;
   a unitary wall mounting nut including a threaded aperture therethrough for matingly engaging said threaded portion of said central segment and an outer flange for abutting an opposing side of a wall member, an annular recess between said outer flange and said threaded aperture for slidably receiving said annular flange on said annular insulative member,
   said annular flange on said insulative member and said annular recess on said wall mounting nut providing adjustability on said stud connector for mounting same through walls of differing thicknesses.

6. The stud connector as defined in claim 5 wherein said first and second male means for attaching female connectors thereon include threaded portions on each.

7. The stud connector as defined in claim 5 wherein said annular flange on said insulative member has a cylindrical outer surface for maximizing the insulation between said bolt central portion and any wall member aperture.

8. The stud connector as defined in claim 5 wherein said annular flange on said insulative member is not threaded for maximizing the insulation between said bolt central portion and any wall member aperture.

9. The stud connector as defined in claim 5 wherein said annular insulative member includes opposed parallel flat annular surfaces on an outside thereof for engaging any open ended wrench used to tighten said stud connector on any wall member.

10. The stud connector as defined in claim 5 wherein said wall mounting nut made of insulative material and includes opposed parallel flat surfaces on an outside thereof for engaging any open ended wrench used to tighten said stud connector on any wall member.

11. A stud connector for mounting on a wall member, said stud connector comprising:
   a unitary stud bolt including opposed first and second male distal threaded portions and a central segment therebetween;
   an annular insulative over molded member around said central segment, said annular insulative member including a radial flange for abutting one side of a wall member, and an annular flange for extending through an aperture in any wall member, and providing electrical insulation between said stud bolt and any wall member, said annular insulative member including opposed parallel flat surfaces on an outside thereof for engaging any open ended wrench used to tighten said stud connector on any wall member, a portion of said central segment externally of said insulative member being threaded;

a unitary wall mounting nut made of insulating material and including a threaded aperture therethrough for matingly engaging said threaded portion of said central segment and an outer flange for abutting an opposing side of a wall member, an annular recess between said outer flange and said threaded aperture for slidably receiving said annular flange on said annular insulative member, said wall mounting nut including opposed second parallel flat surfaces on an outside thereof for engaging any open ended wrench used to tighten said stud connector on any wall member, said annular flange on said insulative member and said annular recess on said wall mounting nut providing adjustability on said stud connector for mounting same through walls of differing thicknesses.

* * * * *